United States Patent [19]
Kolodziej et al.

[11] Patent Number: 4,937,419
[45] Date of Patent: Jun. 26, 1990

[54] PROGRAMMABLE WELD AND MACHINE CONTROLLER

[75] Inventors: Edward R. Kolodziej, Farmington Hills; George O'Neal, Jr., Plymouth; David A. Androvich, Farmington Hills, all of Mich.

[73] Assignee: Robotron Corporation, Southfield, Mich.

[21] Appl. No.: 423,614

[22] Filed: Oct. 16, 1989

Related U.S. Application Data

[63] Continuation of Ser. No. 220,951, Jun. 20, 1988, abandoned, which is a continuation of Ser. No. 64,096, Jun. 18, 1987, abandoned.

[51] Int. Cl.⁵ .................................. B23K 11/24
[52] U.S. Cl. .................................. 219/110
[58] Field of Search ................ 219/108, 109, 110

[56] References Cited

U.S. PATENT DOCUMENTS

| 4,301,351 | 11/1981 | Mathews | 219/110 |
| 4,447,700 | 5/1984 | Cohen | 219/110 |
| 4,456,809 | 6/1984 | Jones et al. | 219/108 |
| 4,628,176 | 12/1986 | Kojima et al. | 219/110 |

*Primary Examiner*—Clifford C. Shaw
*Attorney, Agent, or Firm*—Basile and Hanlon

[57] ABSTRACT

A programmable weld and machine controller for use in controlling a welding machine. The controller includes a central processing unit containing a stored control program connected to a memory which operates both the welding operation of the machine as well as the operation of the machine itself. The controller receives inputs from the machine in its various operational states as well as a data entry and display unit and a current monitor of the welding operation which generates outputs through a heat controlled output to activate a firing circuit to control the welding operation. Back-up of the memory program may be attained through an accessory port to a memory back-up storage unit.

4 Claims, 2 Drawing Sheets

PROGRAMMABLE WELD AND MACHINE CONTROLLER

This application is a continuation of application Ser. No. 220,951, filed on June 20, 1988, now abandoned, which is a continuation of application Ser. No. 064,096, filed June 18, 1987, now abandoned.

BACKGROUND OF THE INVENTION

1. Field of the Invention

The present invention relates, in general, to welding and machine controls and, more specifically, to controllers for such weld and machine control operations.

2. Description of the Prior Art

Programmable logic controllers (PLC) have long been used to control various automatic machine functions, such as actuation of solenoids, pumps, motors, etc. Such PLC's utilize a control program stored in a memory within the PLC which controls the sequence of operation of the machine through its various operation steps. The PLC control program is typically in a programmed electrical relay ladder diagram form.

In a welding application, such as a spot welding operation which bonds two or more sheets of metal together, two electrodes are brought together on opposite sides of the metal sheet stack under pressure for a predetermined period of time and a high current is passed through the electrodes and the metal stack which creates a melting of the area of the metal stack between the electrodes based on the diameter of the electrode tips. This molten area, when solidified forms a nugget which bonds the metal sheets together at that particular point.

However, during repeated operations, the diameter of the electrode tips expands or mushrooms due to the forces involved in contacting the metal stack which enlarges the area through which the current passes between the electrodes and results in inadequate welds. The electrode tips must then be reduced back to their original size based on welding conditions or replaced to maintain optimum welding conditions.

Welding current control sequencers have also been devised which increase the current through the electrodes based on the number of repeated operations of the welding equipment to overcome the expansion or mushrooming of the electrodes. Such sequencers typically operated on the number of sequences or operations of the welding control and increase the current through the electrodes sequentially to overcome the expansion of the electrode tips.

Previously, controllers for activating the ignitron tube or solid state firing device have been separate from the control, either PLC or relay system, which controls the machine utilizing the welding apparatus. This has resulted in a high cost for wiring and labor due to the separate controllers.

Thus, it would be desirable to provide an apparatus which combines both weld control and machine control into one unit to reduce material and labor costs in installing and operating such equipment.

SUMMARY OF THE INVENTION

The present invention is a programmable weld and machine controller which combines the functions of separate weld controllers and machine controllers used in welding operations into a single unit.

The programmable weld and machine controller of the present invention includes a central processing unit operating under a storage program for controlling both the weld operations under a sequenced or stepped program and the machine operations on which the welding operations are being performed. The memory is attached to the controller for storing the control program of the central processing unit as well as data from external inputs, such as limit switches, manually operated push buttons, etc. Address and data control buses connect the central processing unit and the memory to various circuits to control the flow of data therebetween. Under the control of the central processing unit, data may be entered and displayed through a data entry and display unit along with inputs from a current monitor of the welding current, heat control of the weld current itself, inputs and outputs from the various machine operational elements to control the initiation and deactivation of the control unit, a network gateway or communication port to external communication devices, as well as a stand-by memory port for connection to and back-up storage of the control program currently stored within the memory.

The present programmable weld and machine controller overcomes the problems encountered with previously devised devices utilizing separate controllers for the welding operation and the machine control. These functions are combined into a single unit thereby minimizing costs due to reduced labor and the significant reduction in hard wire connections between the separate weld and machine.

DESCRIPTION OF THE DRAWING

Embodiments of the invention are described in greater detail hereinafter relative to the drawings in which.

DESCRIPTION OF THE PREFERRED EMBODIMENTS

Figure 1:
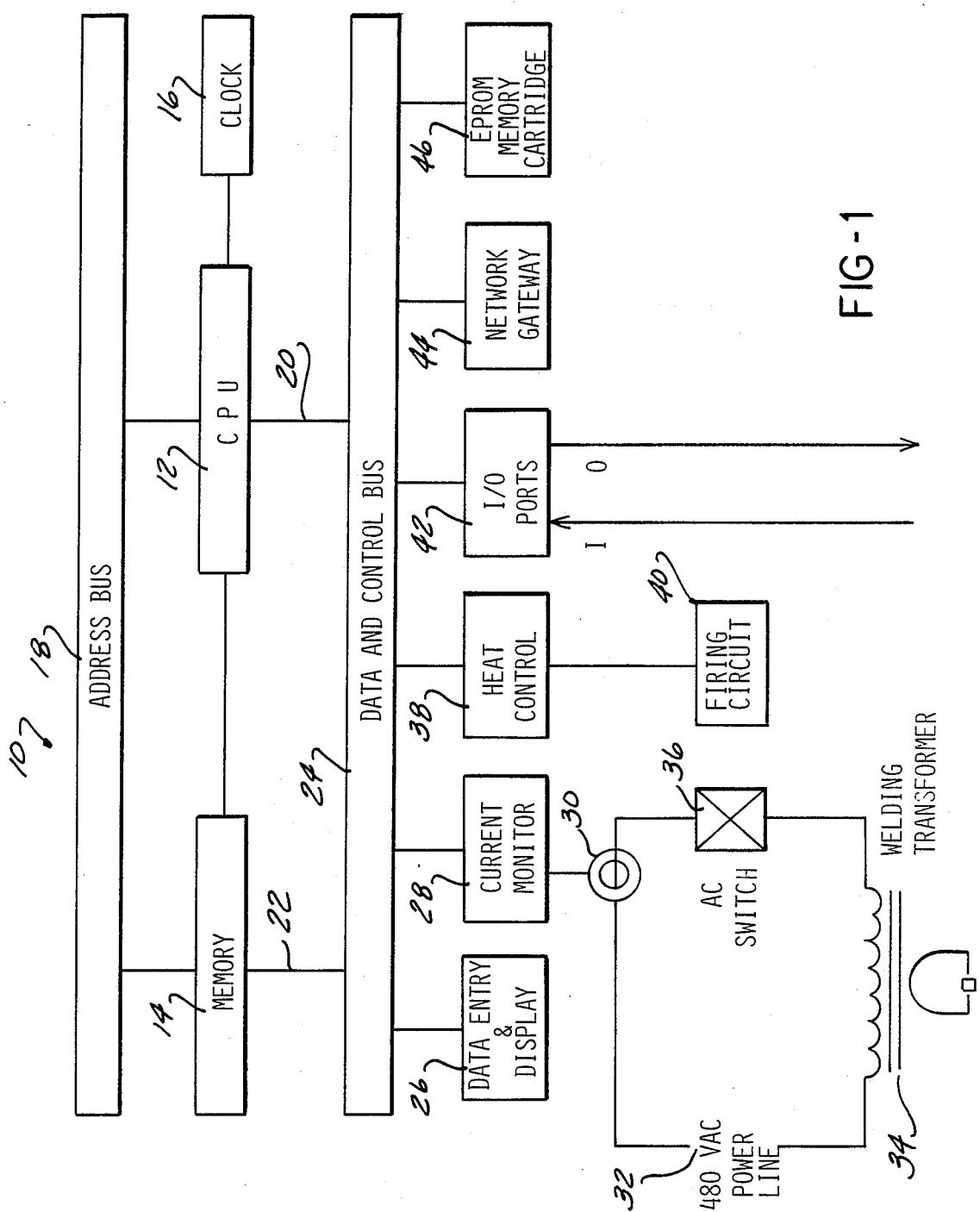
FIG. 1 is the block diagram of the first embodiment which is a programmable weld and machine controller.

In FIG. 1, reference numeral 10 depicts a block diagram of a programmable weld and machine controller. In this block diagram a central processing unit 12 is connected to a memory 14, and a timing clock 16. The CPU 12, memory 14, and clock 16 are connected by an address bus 18. The CPU 12 and the memory 14 are connected via multi-line connectors 20 and 22, respectively, to a data and control bus 24. The data and control bus 24 connects the CPU 12 and memory 14 to a data entry and display 26, a current monitor 28, a heat control 38, input and output ports 42, a network gateway 44, and an EPROM memory cartridge 46.

The data entry and display panel 26 is a separate unit capable of being remotely mounted to the weld and machine controller 10. Without the data entry panel 26 being attached, the main controller 10 will still operate according to the last mode programmed prior to the data entry panel 26 removal.

The current monitor circuit 29 includes a toroid-shaped current sensor 30 connected to a 480 volt power line 32 which senses the weld current. The circuit 29 includes a welding transformer 34 and is controlled by an AC switch 36.

The heat control 38 is accomplished by an analog heat control circuit, preferably digital, although any heat control circuit may be used. This heat control circuit supplies isolation circuitry to the firing circuit 40.

The I/O port 42 allows inputs and outputs to be added as needed in groups of four. Each group has the capability of 24 VAC or DC and 120 VAC power. The I/O modules employed are, by example, Opto, AMF or Gordos Quad Pack's. Some I/O modules are preassigned to certain inputs and outputs for the welding sequencer. The remaining I/O are fully programmable. In any case, any of the I/O can be utilized by the welding sequencer, the programmable control section, or both.

The network gateway 44 operates as an input/output port to other computer systems or can tie in other communication systems such as modems, etc.

The EPROM memory cartridge 46 features the ability to store or load custom user's programs. The EPROM memory cartridge 46 can store both welding sequence and PLC programs.

Figure 2:
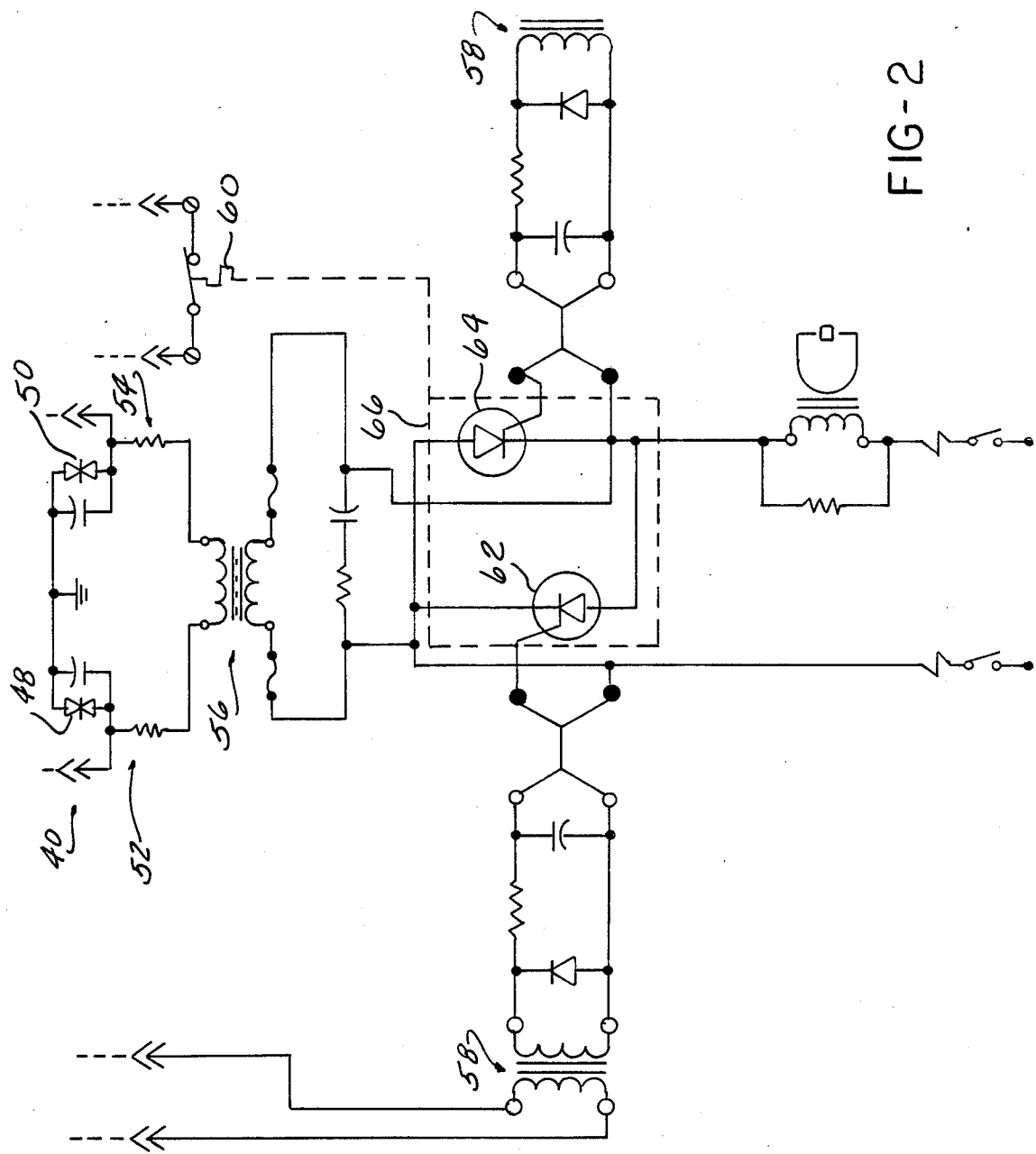
FIG. 2 is the circuit diagram of a second embodiment which is a solid state firing board.

In FIG. 2, reference numeral 40 is a circuit diagram for a solid state firing board which contains isolation circuitry from the heat I/O circuit in the contactor of choice. Reference numerals 48 and 50 designate breakdown diodes in RC arrangements 52 and 54, while 56 designates a feedback transformer with a primary and a secondary winding.

Reference numeral 58 designates a firing pulse transformer through which current is conducted to the SCR's 62 and 64. The over temperature switch is designated by reference numeral 60. If the over temperature switch 60 is open no firing can take place. The over temperature switch 60 is applied to an input port on the heat control 38 which generates the firing timing and delivers it to the SCR firing circuit 66. The over temperature switch 60 is controlled by SCR 62 or SCR 64.

After each firing pulse, the contactor feedback should go low because the contactor should be on. Missing or late feedback constitutes half cycling. Half cycling indicates that one of the pair of SCR's 62 or 64 has failed to fire on time for three consecutive half cycles of the same polarity.

We claim:

1. A programmable weld and machine controller for a machine having input and output devices and moveable through a sequence of operative states including welding operations on workpieces comprising:
    input means responsive to the input devices for indicating the state of the machine during operation;
    output means for controlling the output devices in operating the machine;
    a single memory means for storing a control program having a sequence portion and a programmable control portion, the memory means storing the status of the input means and the output means;
    a first portion of the memory means corresponding to the status of the input means and the output means being dedicated to the input means and the output means and controlled by the sequence portion of the control program;
    a second portion of the memory means being programmable by the sequence portion and the programmable control portion of the control program; and
    a single control processing means, responsive to the input means, the output means and the first and second portions of the memory means and executing a stored control program, for reading and setting the memory means and actuating the output means to control the operation of the machine in response to the sequence portion and the programmable control portion of the control program.

2. The programmable weld and machine controller of claim 1 further including data entry and display means for entering data into the central processing means and visually displaying such data.

3. The programmable weld and machine controller of claim 1 further including removable memory replacement means for storing the control program in the memory means and removing it from the programmable weld and machine controller, the memory replacement means being connectable to the central processing means.

4. The programmable weld and machine controller of claim 1 further including:
    weld current generating means for generating a welding electric current; and
    weld current monitoring means, input to the central processing means, for monitoring the welding electric current generated by the weld current generating means.

* * * * *